(12) United States Patent
Komatsu et al.

(10) Patent No.: US 9,652,079 B2
(45) Date of Patent: May 16, 2017

(54) OPERATING DEVICE

(71) Applicant: DMG MORI SEIKI CO., LTD., Nara (JP)

(72) Inventors: Masahiro Komatsu, Nara (JP); Tsutomu Kuramoto, Nara (JP)

(73) Assignee: DMG MORI SEIKI CO., LTD., Nara (JP)

( * ) Notice: Subject to any disclaimer, the term of this patent is extended or adjusted under 35 U.S.C. 154(b) by 6 days.

(21) Appl. No.: 14/717,759

(22) Filed: May 20, 2015

(65) Prior Publication Data

US 2015/0346906 A1    Dec. 3, 2015

(30) Foreign Application Priority Data

May 30, 2014   (JP) ................................ 2014-112462

(51) Int. Cl.
| | | |
|---|---|---|
| *G06F 3/041* | (2006.01) | |
| *G06F 3/044* | (2006.01) | |
| *G06F 11/00* | (2006.01) | |

(52) U.S. Cl.
CPC ............ *G06F 3/0418* (2013.01); *G06F 3/044* (2013.01); *G06F 3/0416* (2013.01); *G06F 11/00* (2013.01)

(58) Field of Classification Search
CPC ...... G06F 3/0418; G06F 11/00; G06F 3/0416; G06F 3/044
See application file for complete search history.

(56) References Cited

U.S. PATENT DOCUMENTS

2011/0267280 A1*  11/2011  De Mers ............. G06F 3/04886
                                                    345/173
2012/0200524 A1*   8/2012  Vallis ..................... G06F 3/044
                                                    345/174

FOREIGN PATENT DOCUMENTS

WO        2010030710 A1      3/2010

* cited by examiner

*Primary Examiner* — Premal Patel
(74) *Attorney, Agent, or Firm* — Miller, Matthias & Hull LLP

(57) ABSTRACT

An operating device includes a touch panel 21 having a display 22 on which a screen is displayed and an input element 23 having a plurality of electrodes and outputting a signal corresponding to capacitance generated between a ground potential and each of the electrodes, an input signal processor 14 receiving the signals output from the electrodes of the input element 23, recognizing a touched position touched by an operator, and generating an operation signal corresponding to the recognized touched position and transmitting the generated operation signal to a controller 3, and determiner 16 determining whether the input element 23 is electrically stable or not. When the input element 23 is determined to be electrically unstable, the determiner 16 displays a warning screen or warning window on the display 22.

12 Claims, 10 Drawing Sheets

OPERATING DEVICE

BACKGROUND

Field of the Disclosure

The present disclosure relates to an operating device that is connected to a controller for controlling an operation target and inputting an operation signal for operating the operation target to the controller.

Background of the Disclosure

As a conventional example, an operating device may be connected to a numerical controller of an NC machine tool. An NC machine tool typically includes a machining mechanism performing operations for machining a workpiece and a numerical controller controlling the operations of the machining mechanism. For example, in a case of a lathe, the machining mechanism includes a spindle holding and rotating a workpiece, a drive mechanism for the spindle, a tool rest holding a tool, a feed mechanism moving the tool rest in predetermined axis directions, and so on, whereas in a case of a machining center, the machining mechanism includes a table holding the workpiece, a spindle holding a tool, a drive mechanism for the spindle, a feed mechanism relatively moving the table and the spindle in predetermined axis directions, and so on.

Further, a typical operating device includes a display for displaying the status of the machining mechanism and various types of machining information and an operation unit having operation keys for inputting operation signals to the numerical controller; furthermore, in recent years, there is an operating device configured so that a touch panel having the so-called man-machine interface function forms the display and the operation unit, operation keys as softkeys are displayed on the touch panel, and when an operator presses the operation keys, corresponding operation signals are input to the numerical controller.

As for such a touch panel, various touch panels have conventionally been proposed, such as a touch key and a touch screen. As for the touch key, a capacitance type touch key is commonly used, which has a touch electrode formed by materials such as a printed circuit board, an ITO (indium tin oxide) film, and conductive rubber and which is configured to determine whether the key is ON or OFF by measuring capacitance generated between the key and a human body.

Further, as for the touch screen, there is similarly a capacitance type; besides, there are a resistance film type, an optical, and a sonic type. Of these types of touch screens, the capacitance type touch screen includes a self-capacitance detection type and a mutual-capacitance detection type; both of them have electrodes formed by materials such as a printed circuit board, an ITO film, and so on and arranged in a matrix form in X and Y directions.

As shown in FIG. 8, a mutual-capacitance detection type touch screen has electrodes formed in a grid-like form by arranging band-shaped wires 101 in the X and Y directions so that the wires 101 in X direction are orthogonal to the wires 101 in the Y direction. As shown in FIG. 9, this mutual-capacitance detection type touch screen has a configuration in which its electrodes are composed of receivers 102 and transmitters 103 and the receivers 102 are grounded to a ground; an electric field (field coupling) 104 occurs between the receivers 102 and the transmitters 103 as shown in FIG. 9 when a pulse is input to the transmitters 103. Further, as shown in FIG. 10, when an operator's finger 105 approaches the transmitter 103, the electric field 104 between the receiver 102 and the transmitter 103 is reduced because a part 104a of the electric field occurs between the transmitter 103 and the operator's finger 105; therefore, touch of the operator's finger 105 is detected by measuring reduction in charge accompanying the reduction of the electric field 104.

On the other hand, as shown in FIG. 11, a self-capacitance detection type touch screen has a configuration in which rhombic electrodes 110 are connected together in the X and Y directions and they are arranged in a lattice pattern. As shown in FIG. 12, in this self-capacitance detection type touch screen, parasitic capacitance is generated between each of the electrode 110 and a ground pattern of a printed circuit board or a metal frame positioned around the electrode 110. Further, as shown in FIG. 13, when an operator's finger 105 approaches the electrode 110, capacitance is generated between the operator's finger 105 and the electrode 110 because the operator is grounded to a virtual ground, which results in increase in capacitance in the electrode 110. In the self-capacitance detection type touch screen, touch of the operator's finger 105 is detected by measuring the increase in the capacitance in the electrode 110.

It is noted that, as an example of inventions that relate to a mutual-capacitance detection type touch screen, the invention disclosed in Japanese Unexamined Patent Application Publication No. 2012-502397 has conventionally been known.

SUMMARY OF THE DISCLOSURE

While the mutual-capacitance detection type touch screen may be complex in that a system for transmitting the pulse is necessary, it does provide enhanced resistance to noise by surrounding the receivers 102 with the transmitters 103.

On the other hand, although the self-capacitance detection type touch screen has a simple configuration, its resistance to noise is low because the electrodes 110 and the wires to a detection IC cannot be protected by the ground pattern. In point of fact, the capacitance greatly varies due to variation in the ground potential under an environment where the ground potential is unstable; therefore, even when the operator does not touch the touch screen, the capacitances in the electrodes 110 increase in a similar manner to when the operator touches the touch panel, which causes a problem that touch of the operator is misdetected.

Accordingly, if such a self-capacitance detection type touch screen is used in an operating device of an NC machine tool, it may falsely sense a touch of an operation key when the key was not, in fact pressed, and therefore the NC machine tool operates in response to the false detection. In a plant where an NC machine tool is installed, the ground potential easily becomes unstable due to various factors, and therefore a countermeasure for this problem is desired.

The present disclosure provides an operating device that uses a self-capacitance detection type touch screen as an input element for inputting a signal and is capable of, when the input element becomes electrically unstable, detecting that the input element is unstable.

The present invention, for solving the above-described problems, relates to an operating device connected to a controller controlling an operation target in order to input an operation signal for operating the operation target to the controller, the operating device including:

a touch panel having a display on which a screen is displayed and an input element superimposed on the display and having a plurality of electrodes arranged in a matrix form on a two-dimensional plane, the input element being configured to output a signal corresponding to capacitance generated between a ground potential and each of the electrodes;

a display screen data storage storing therein at least data relating to a screen to be displayed on the display of the touch panel and relating to an operation screen in which one or more operation keys are arranged;

an operation information storage storing therein operation information defined corresponding to a position on the operation screen to be displayed on the display;

a display controller reading out the operation screen data stored in the display screen data storage and displaying the operation screen on the display of the touch panel;

an input signal processor receiving signals output from the electrodes of the input element, recognizing a touched position touched by an operator based on the received signals, generating an operation signal by referring to the operation information stored in the operation information storage based on the recognized touched position, and transmitting the generated operation signal to the controller; and a determiner receiving the signals output from the electrodes of the input element or signals output from a noise detection element that outputs signals having correlation with the signals output from the electrodes of the input element, and determining whether the input element is electrically stable or not, wherein the display screen data storage further stores therein data relating to a warning screen or warning window for warning display, and the determiner is further configured to cause the display controller to display the warning screen or warning window on the display based on the warning screen or warning window data stored in the display screen data storage when the input element is determined to be electrically unstable.

According to the operating device of the present disclosure, under control by the display controller, the operation screen is displayed on the display of the touch panel based on the data relating to the operation screen stored in the display screen data storage.

Meanwhile, capacitance is generated between a ground potential and each of the electrodes forming the input element of the touch panel; for each of the electrodes, a signal (for example, a voltage signal) corresponding to the capacitance is transmitted from the input element to the input signal processor and to the determiner.

Further, once an operator touches the touch panel, the capacitance of an electrode arranged at the touched position and the capacitances of electrodes positioned around it are increased and signals corresponding to the increased capacitances are transmitted from the input element to the input signal processor. The input signal processor processes values of the thus input signals at predetermined sampling intervals, recognizes the electrodes with increased capacitance, that is, the position touched by the operator on the touch panel (on the operation screen), refers to the operation information stored in the operation information storage based on the recognized touched position, and, in a case where the recognized touched position is a position corresponding to the operation key on the operation screen, generates an operation signal corresponding to the operation information and transmits the generated operation signal to the controller.

By the way, a so-called self-capacitance detection type input element like the above-described input element, which is configured to detect a touch of an operator by detecting a change in the capacitances generated between a ground potential and the electrodes, as described above, has a problem that misdetection occurs in an environment where the ground potential is unstable because the capacitances greatly vary due to variation in the ground potential and therefore, even when an operator is not touching the input element, the capacitances of the electrodes are increased in a similar manner to when an operator is touching the input element.

Therefore, the operating device of the present disclosure is configured so that the determiner determines, based on the signals output from the electrodes of the input element or signals output from a noise detection element that outputs signals having correlation with the signals output from the electrodes of the input element, whether the input element is electrically stable or not, and further, the display controller displays a warning screen or warning window on the display based on the warning screen or warning window data stored in the display screen data storage when the input element has been determined to be electrically unstable.

Thus, in the operating device of the present disclosure, when the input element is electrically unstable because the ground potential has become unstable or other reasons, this is recognized by the determiner and a warning screen or warning window indicating that the input element is electrically unstable is displayed on the display. Therefore, according to this operating device, since the warning screen or warning window is displayed on the display, an operator can recognize that the input element is electrically unstable, and can take an appropriate measure such as interrupting an operation performed using the operating device. Further, for example, in a case where the operating device is a device for operating a machining mechanism like a machine tool, taking such a measure can prevent a problem that the machining mechanism operates in accordance with the misdetection as mentioned above It is noted that the noise detection element detects a ground noise and element that detects a noise current flowing through the electrodes, an antenna and a ground wire can be used as the noise detection element. The term "noise" means an environmental relative potential variation with respect to a detection reference potential of a self-capacitance detection type touch panel, for example; in order to detect this variation by the noise detection element, correlation between a noise level detected by the noise detection element and noise based on the detection reference potential of the touch panel should be obtained in advance.

In the present disclosure, the operating device may have a configuration in which:

the input signal processor is configured to compare each of the signals output from the electrodes of the input element with a predetermined touch reference value and recognize a position corresponding to an electrode outputting a signal exceeding the touch reference value as the touched position; and the determiner determines that the input element is electrically unstable, at least when, in a case where each of the signals output from the electrodes of the input element is compared with the touch reference value and a stability determination reference value smaller than the touch reference value, an electrode outputting a signal not less than the stability determination reference value and not more than the touch reference value is present, or when, in a case where each of the signals output from the electrodes of the input element is compared with the touch reference value, a sum of areas where electrodes outputting a signal equal to or larger than the touch reference value are positioned exceeds a predetermined reference sum of area.

As described above, once an operator touches the touch panel, the capacitance of an electrode positioned at the touched portion and the capacitances of electrodes positioned around it are increased. Therefore, the input signal processor can compare each of the signals output from the electrodes of the input element with a predetermined touch reference value and recognize a position corresponding to electrodes outputting a signal exceeding the touch reference value as the touched position.

Further, when the input element is electrically unstable, there is a case where, even though an operator is not touching the touch panel, the capacitances of the electrodes as a whole greatly vary and output values from the electrodes exhibit the behavior of not exceeding the touch reference value but exceeding a predetermined value smaller than the touch reference value (which is referred to as the "stability determination reference value" mentioned above). Therefore, in a case where each of the signals output from the electrodes of the input element is compared with the touch reference value and the stability determination reference value, the determiner can regard the input element as electrically unstable when an electrode outputting a signal not less than the stability determination reference value and not more than the touch reference value is present.

Further, when the input element is electrically unstable, there is also a case where, even though an operator is not touching the touch panel, output values from the electrodes exhibit the behavior of exceeding the touch reference value. In this case, it is necessary to distinguish increase in the capacitances caused by the electrically unstable input element from increase in the capacitances caused by a touch of an operator. Generally, the number of the touched positions on the touch panel allowed for an operator is not limited to one position (one point), and an operator is allowed to touch, for example, two positions (two points), three positions (three points) or the like; if the number of positions touched by an operator recognized exceeds the allowed number, the input may be disabled, for example. Further, if a touched area is larger than a predetermined area, for example, when an operator touches the touch panel with the entire palm of his hand, the input may be regarded as an inappropriate input and disabled. Thus, when the sum of areas where electrodes with increased capacitance caused by a touch of an operator are positioned is within a predetermined reference sum of area, the touch can be regarded as appropriate. Therefore, when the sum of areas of electrodes outputting a signal equal to or larger than the touch reference value exceeds the predetermined reference sum of area, there is no practical problem if the input is regarded as an inappropriate input and the input element is regarded as electrically unstable. That is, it is acknowledged that, even if the input element is not electrically unstable, when checking the warning screen or warning window displayed on the display, the operator can easily understand the warning screen or warning window is displayed due to his inappropriate input because the input is caused by his own act.

Further, in the present disclosure, the operating device may have a configuration in which:

the display screen data storage stores therein data relating to a plurality of warning screens or warning windows set corresponding to the degree of instability of the input element; and the determiner is configured to, at least, count how many times of a signal that is output from the electrodes of the input element and indicates a value not less than the stability determination reference value and not more than the touch reference value is detected in a predetermined time period, or how many times the sum of areas where electrodes outputting a signal equal to or larger than the touch reference value are positioned exceeds the predetermined reference sum of area in the predetermined time period, classify the degree of instability of the input element in accordance with the counted number of times, and cause the display controller to display a warning screen or warning window corresponding to the classification of the degree of instability on the display based on the warning screen or warning window data stored in the display screen data storage.

That is, the determiner counts how many times the unstable input element appears in a predetermined time period and classifies the degree of instability into any one of instability levels which are set according to the appearance frequency, for example, three levels: "HIGH", "MIDDLE", and "LOW". The display controller refers to the warning screen or warning window data stored in the display screen data storage and displays, on the display, a warning screen or warning window corresponding to the instability level into which the degree of instability was classified. Thus, an operator can recognize the degree of instability by checking the warning screen or warning window displayed on the display and take action corresponding to the degree of instability of the input element, for example, emergently cancelling operations when the degree of instability is "HIGH", finishing a current operation and then cancelling subsequent operations when the degree of instability is "MIDDLE", or continuing operations while carefully checking safety when the degree of instability is "LOW".

Further, in the present disclosure, the operating device may have a configuration in which the input signal processor is configured to transmit no operation signal to the controller when the determiner has determined that the input element is electrically unstable.

When thus configured, in a case where the operating device is a device for operating a machining mechanism like a machine tool, for example, it is possible to prevent a problem that the machining mechanism operates in accordance with misdetection of input.

Further, in the present disclosure, the operating device may have a configuration in which the input signal processor is configured to, when the determiner has determined that the input element is electrically unstable, generate an operation signal corresponding to the recognized touched position and transmit the generated operation signal to the controller in a case where a single touched position is recognized, and transmit no operation signal to the controller in a case where two or more touched positions are recognized simultaneously.

As described above, when the input element is electrically unstable, there is a case where output values from the electrodes exceed the touch reference value even though an operator is not touching the touch panel. In this case, if an operator touches two or more positions on the touch panel simultaneously, these touches often induce electrodes positioned at other positions around the touched positions to output a value larger than the touch reference value. Therefore, in a case where a single touched position is recognized, there is no problem if the touched position is regarded as a position actually touched by the operator. If, to the contrary, all input from the input element is disabled as described above when the input element is electrically unstable, although it is possible to enhance safety, the operability can be impaired too much. Therefore, by regarding input from the input element as valid in a case where a single touched position is recognized, the operator is allowed to continue single-touch input and allowed to continuously perform operations while checking safety even when the input element has been determined to be electrically unstable; therefore, the operability is not impaired extremely.

Further, in the present disclosure, the warning screen or warning window data stored in the display screen data storage may include contents urging the operator not to touch multiple positions on the touch panel simultaneously.

As described above, when the input element is electrically unstable, if an operator touches multiple points on the touch panel, theses touches often induce electrodes positioned at other positions around the touched positions, that is, electrodes positioned at positions that are not touched by the operator, to output a value larger than the touch reference value. In contrast, in the case where an operator touches a single point on the touch panel, misdetection of input as described above hardly occurs and relatively stable inputs are made. Therefore, it is preferred that an operator makes inputs by touching a single point on the touch panel when the input element is electrically unstable. When, as described above, contents urging the operator not to touch multiple points simultaneously on the touch panel are included in the warning screen or warning window displayed when the input element is electrically unstable, it is possible to urge the operator to make inputs by touching a single point on the touch panel, which enables a stable operation input even under the situation where the input element is electrically unstable.

As described above, according to the operating device of the present disclosure, when the input element is electrically unstable, this is recognized by the determiner and a warning screen or warning window indicating that the input element is electrically unstable is displayed on the display. Further, because this warning screen or warning window is displayed, an operator can recognize that the input element is electrically unstable, and take an appropriate measure such as interrupting the operation performed by the operating device.

Further, when the operating device is configured so that no operation signal is transmitted from the input signal processor to the controller when the determiner has determined that the input element is electrically unstable, in a case where the operating device is a device for operating a machining mechanism like a machine tool, for example, it is possible to prevent the machining mechanism from operating in accordance with misdetection of input.

Furthermore, when the operation device is configured so that, when the determiner has determined that the input element is electrically unstable, in a case where a single touched position is recognized, an operation signal corresponding to the touched position is transmitted from the input signal processor to the controller, and in a case where two or more touched positions are recognized simultaneously, no operation signal is transmitted from the input signal processor to the controller, the operator can continue single-touch input with a low possibility of misdetection, and therefore the operability is not impaired extremely because the operator can continuously perform operations while checking safety even when the input element is determined to be electrically unstable.

BRIEF DESCRIPTION OF THE DRAWINGS

For a more complete understanding of the disclosed methods and apparatus, reference should be made to the embodiment illustrated in greater detail on the accompanying drawings, wherein.

DETAILED DESCRIPTION

Specific embodiments of the present disclosure will be described below with reference to the drawings.

Figure 1:
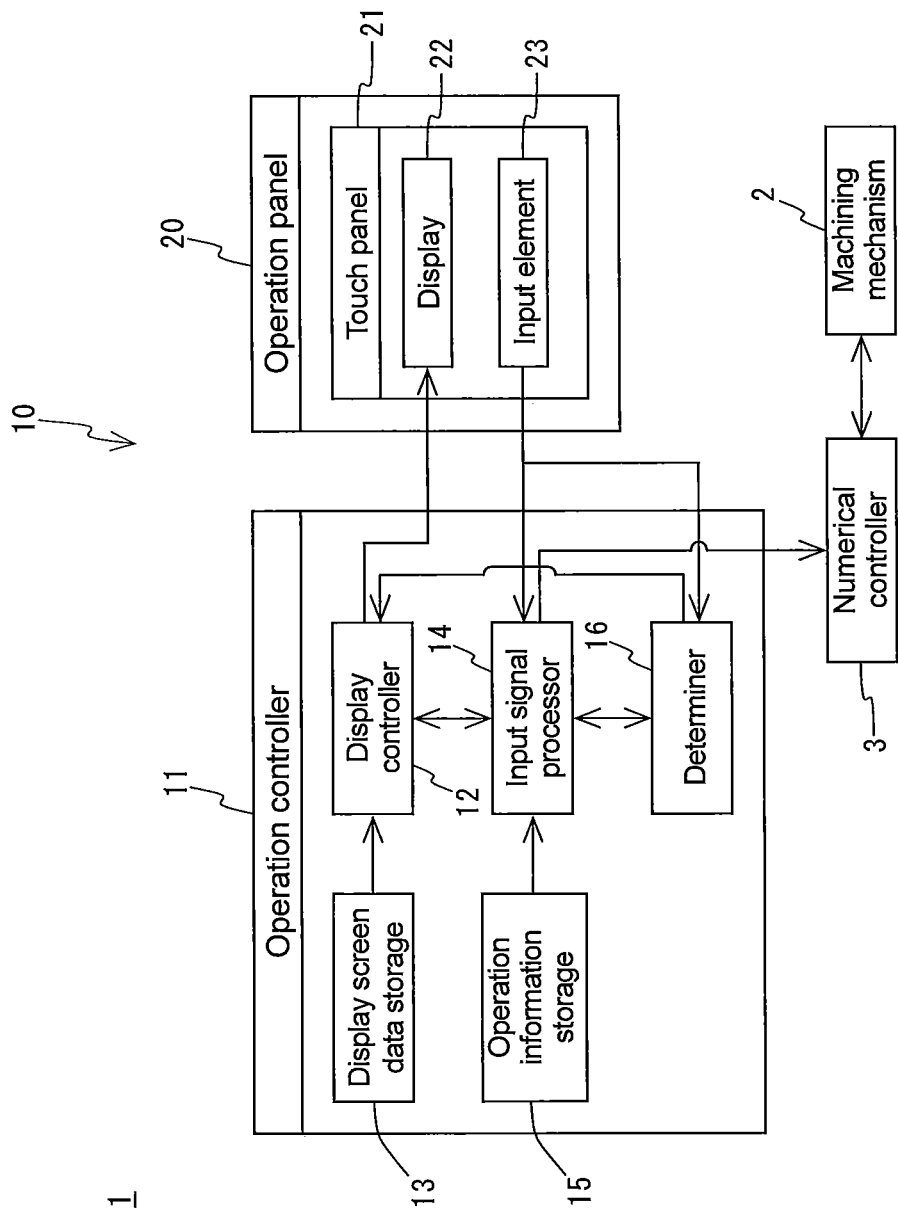
FIG. 1 is a block diagram showing a schematic configuration of an NC machine tool including an operating device according to one embodiment of the present disclosure.

As shown in FIG. 1, an operating device 10 of the present embodiment forms a part of a machine tool 1 and consists of an operation controller 11 and an operation panel 20; the operation controller 11 consists of a display controller 12, a display screen data storage 13, an input signal processor 14, an operation information storage 15, and a determiner 16, and the operation panel 20 has a touch panel 21.

It is noted that, as shown in FIG. 1, the machine tool 1 includes, besides the operating device 10, a machining mechanism 2 machining a workpiece, a numerical controller 3 numerically controlling operation of the machining mechanism 2, and other components. For example, in a case where the machine tool 1 is a lathe, the machining mechanism 2 includes a spindle holding and rotating the workpiece, a drive mechanism for the spindle, a tool rest holding a tool, a feed mechanism moving the tool rest in predetermined axis directions, and so on; on the other hand, in a case where the machine tool 1 is a machining center, the machining mechanism 2 includes a table holding the workpiece, a spindle holding a tool, a drive mechanism for the spindle, a feed mechanism relatively moving the table and the spindle in predetermined axis directions, and so on.

The touch panel 21 has a display 22 on which a screen is displayed and an input element 23 superimposed on the display 22; the display 22 can be visually recognized from the outside through the input element 23. It is noted that the input element 23 has a plurality of electrodes arranged in a matrix form on a two-dimensional plane and is configured to output a signal corresponding to capacitance generated between a ground potential and each of the electrodes, and the input element 23 employs the so-called self-capacitance detection method. Each of the electrodes has a capacitance generated between the ground potential and it; for each of the electrodes, a signal (for example, a voltage signal) corresponding to the capacitance is transmitted to the input signal processor 14 and to the determiner 16.

The display screen data storage 13 is a functional unit that stores therein data relating to display screens to be displayed on the display 22 of the touch panel 21, and the display controller 12 is a processor that displays an appropriate display screen on the display 22 based on the display screen data stored in the display screen data storage 13.

Figure 2:
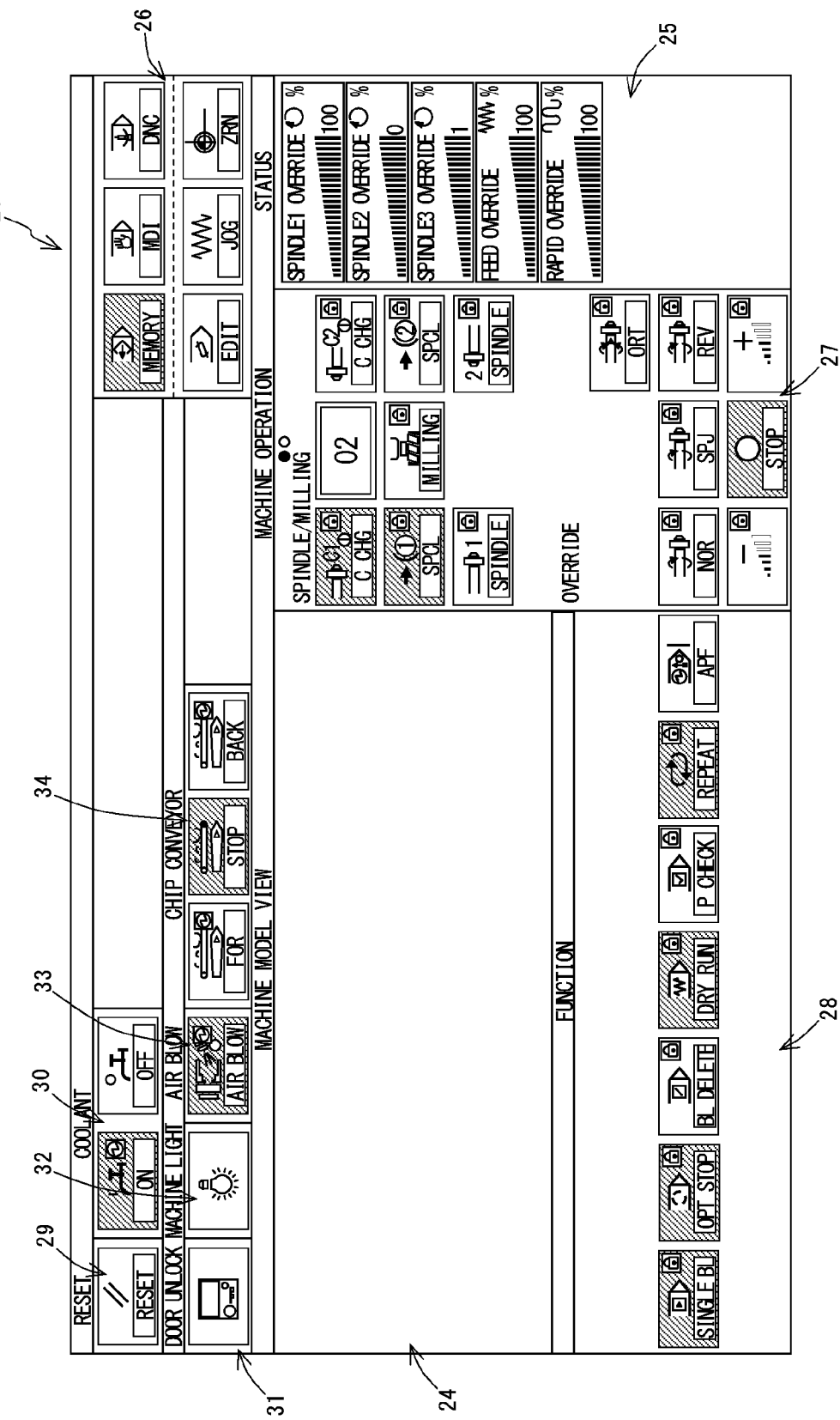
FIG. 2 is a diagram showing a first screen shot of a display screen of an operating device according to a first embodiment.

The display screens to be displayed on the display 22 include at least operation screens for operating the machining mechanism 2 and a plurality of warning screens or warning windows set corresponding to results of determination by the determiner 16. Examples of the operation screens to be displayed on the display 22 are shown in FIG. 2. In FIG. 2, the display 22 is divided into eleven display areas 24 to 34 and data on the operation screens displayed in the display areas 24 to 34 is stored in the display screen data storage 15.

In this connection, the display area 24 is an area where a three-dimensional model of the machining mechanism 2 is displayed, and the display area 25 is an area where a screen relating to a current load status of the spindle drive motor and cutting-feed override and rapid-traverse override currently set for the feed mechanism is displayed.

Further, the display areas 26 to 34 are areas where operation keys for allowing an operator to input an operation signal are displayed; a mode switching screen in which mode keys for selecting one of a plurality of operation modes are arranged is displayed in the display area 26. In the example shown in FIG. 2, mode keys corresponding to a memory operation mode (MEMORY), an MDI operation mode (MDI), an DNC operation mode (DNC), an editing mode (EDIT), a jog feed mode (JOG), and a zero return mode (ZRN) are displayed in the mode switching screen display area 26.

Furthermore, the display areas 27 and 28 are areas where operations screens in which operation keys set for each of the operation modes are arranged are displayed; the display area 29 is an area where a reset key is displayed; the display area 30 is an area where operation keys for turning on and off coolant are displayed; the display area 31 is an area where a door unlock key is displayed; the display area 32 is an area where an operation key for turning on and off a light installed to the machine tool; the display area 33 is an area where an operation key for turning on and off an air blow is displayed; and the display area 34 is an area where operation keys for operating a chip conveyor are displayed.

Figure 3:
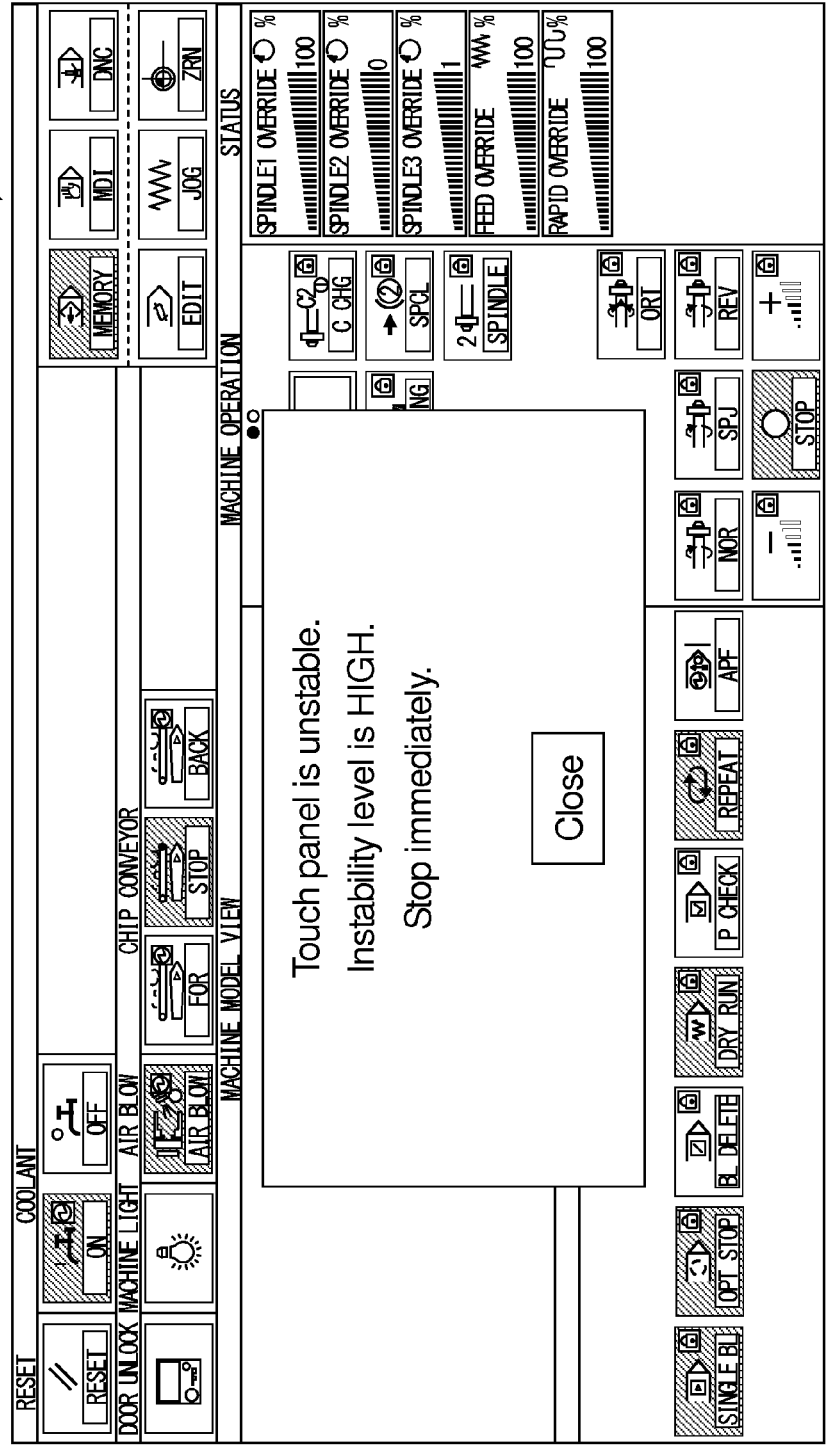
FIG. 3 is a diagram showing a second screen shot of the display screen of the operating device according to the first embodiment.
Figure 4:
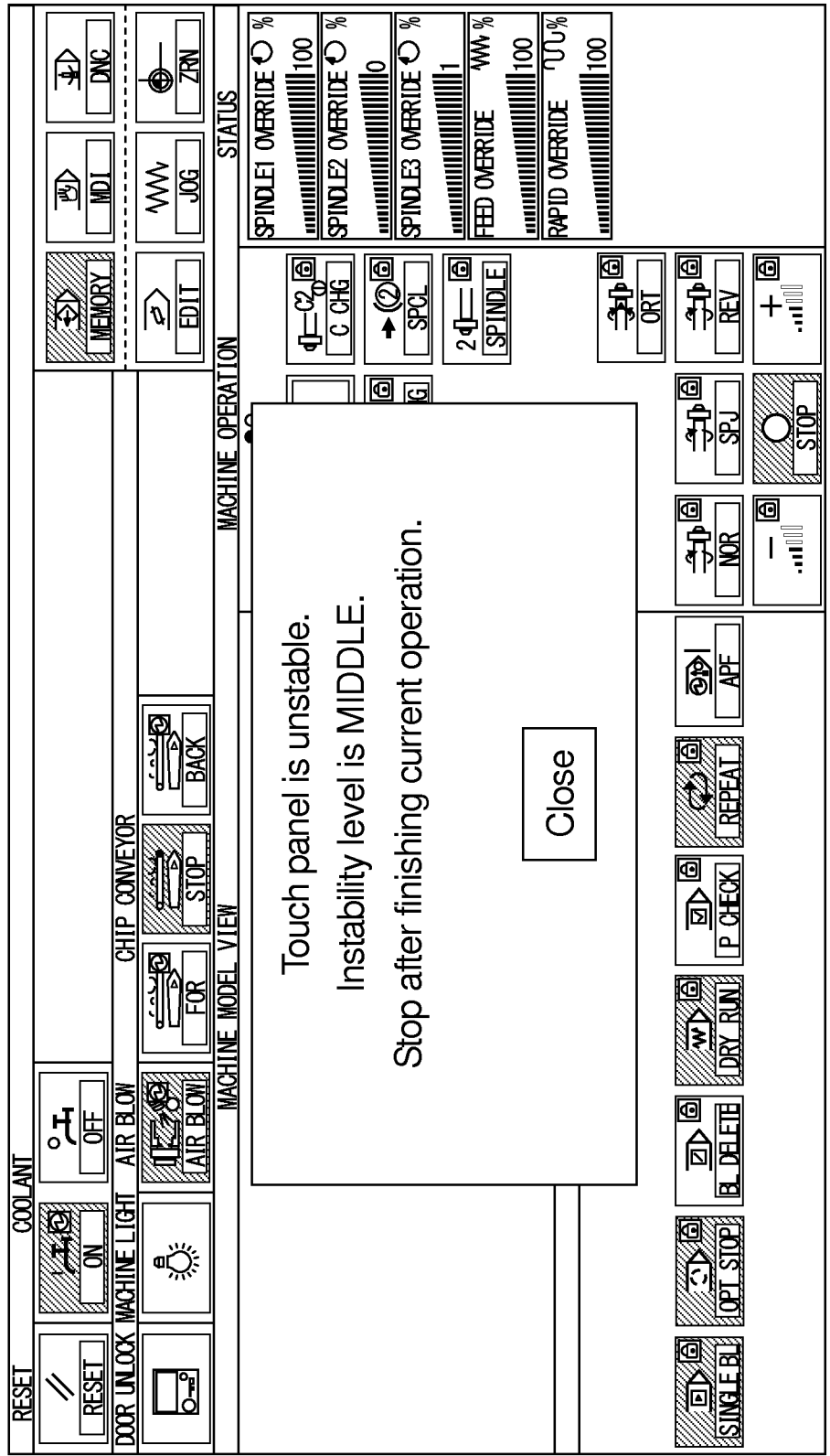
FIG. 4 is a diagram showing a third screen shot of the display screen of the operating device according to the first embodiment.
Figure 5:
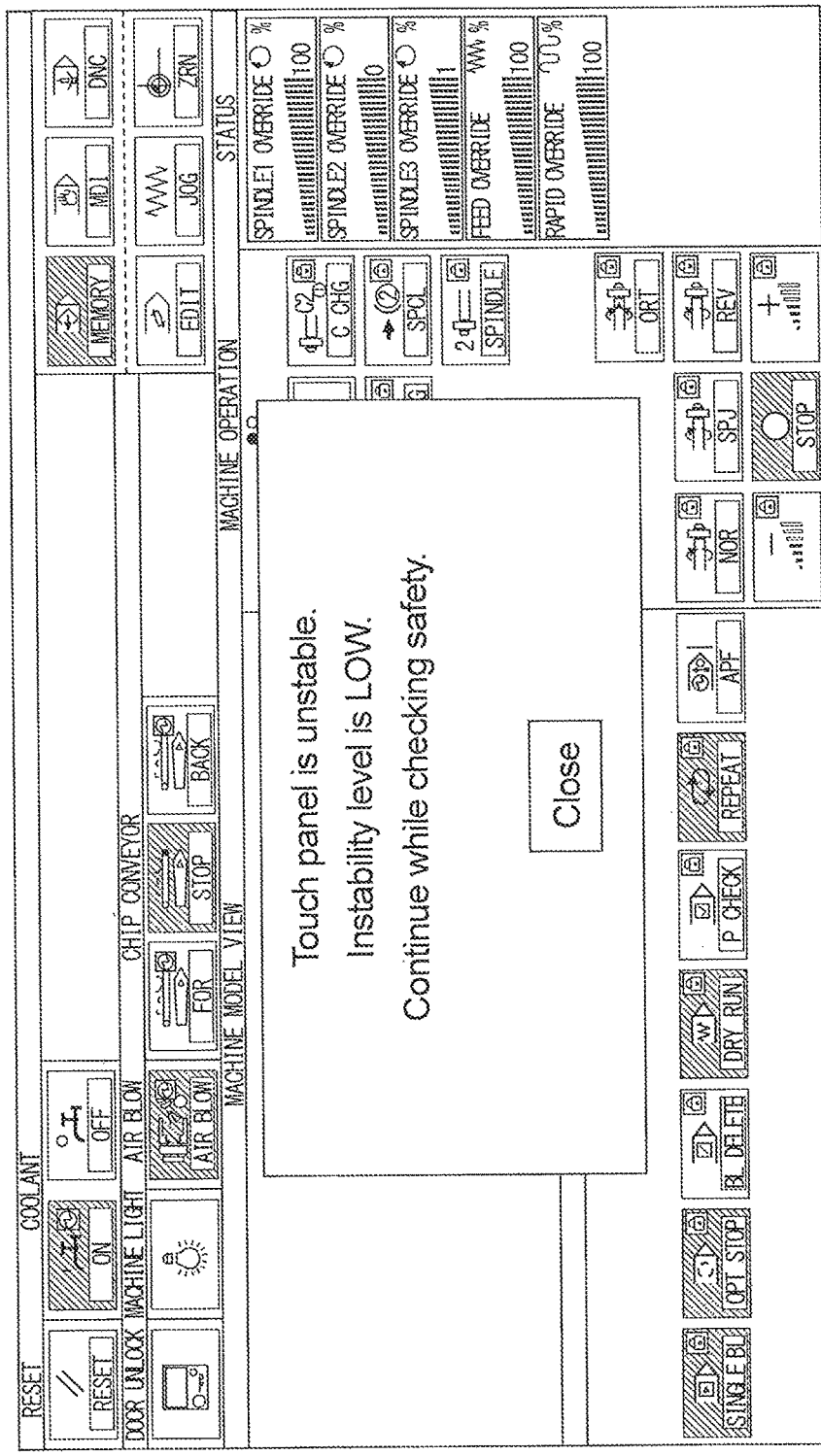
FIG. 5 is a diagram showing a fourth screen shot of the display screen of the operating device according to the first embodiment.

Further, examples of the warning screens or warning windows are shown in FIGS. 3 to 5. These warning screens or warning windows are each displayed overlapping the display screens currently displayed on the display 22 under control by the display controller 12. It is noted that FIG. 3 shows a warning screen or warning window for a case where the degree of instability of the input element 23 is "HIGH" as a result of determination by the determiner 16, FIG. 4 shows a warning screen or warning window for a case where the degree of instability is "MIDDLE", and FIG. 5 shows a warning screen or warning window for a case where the degree of instability is "LOW".

The operation information storage 15 is a functional unit that stores therein operation information in which the positions of the operation keys displayed on the display 22 are associated with operation contents.

The input signal processor 14 receives signals transmitted from the input element 23 of the touch panel 21, recognizes a touched position that is touched by an operator on the touch panel 21, that is, on the operation screens, refers to the operation information stored in the operation information storage 15 based on the recognized touched position, and, in a case where the recognized touched position is a position corresponding to an operation key on an operation screen, generates an operation signal corresponding to the operation information for the operation key and transmits the generated operation signal to the numerical controller 3.

When an operator touches the touch panel 21, capacitance of an electrode positioned at the touched portion and capacitances of electrodes positioned around it are increased. Therefore, signals corresponding to the increased capacitances are transmitted to the input signal processor 14 from the input element 23. The input signal processor 14 compares values of signals that are input from the input element 23 in this manner with a touch reference value at predetermined sampling intervals, and recognizes a position corresponding to electrodes outputting a signal larger than the touch reference value as the touched position.

The determiner 16 also receives the signals transmitted from the input element 23, determines whether the input element 23 is electrically stable or not, and, when the input element 23 is determined to be electrically unstable, transmits a warning display signal corresponding to the degree of instability of the input element 23 to the display controller 12 so that a warning screen or warning window corresponding to the degree of instability is displayed on the display 22 under control by the display controller 12.

There are various possible methods for the processing of determining whether the input element 23 is electrically stable or not. However, in the present embodiment, in a case where the signals output from the electrodes of the input element 23 are compared with the touch reference value and a stability determination reference value which is smaller than the touch reference value, the input element 23 is determined to be electrically unstable when there is an electrode outputting a signal not less than the stability determination reference value and not more than the touch reference value; on the other hand, in a case where the signals output from the electrodes of the input element 23 are compared with the touch reference value, the input element 23 is determined to be electrically unstable when the sum of areas where electrodes outputting a signal equal to or larger than the touch reference value are positioned is larger than a predetermined reference sum of area.

When the input element 23 is electrically unstable, there is a case where, even though an operator is not touching the touch panel, capacitances of the electrodes as a whole greatly vary and output values from the electrodes exhibit the behavior of not exceeding the touch reference value but exceeding a predetermined value smaller than the touch reference value (which is referred to as the "stability determination reference value" mentioned above). Therefore, in the case where the signals output from the electrodes of the input element 23 are compared with the touch reference value and the stability determination reference value, the determiner 16 can regard the input element 23 as electrically unstable when there is an electrode outputting a signal not less than the stability determination reference value and not more than the touch reference value.

Further, when the input element 23 is electrically unstable, there is a case where, even though the operator is not touching the touch panel, output values from the electrodes exceed the touch reference value. In this case, it is necessary to distinguish increase in capacitance caused by the electrically unstable input element 23 from increase in capacitance caused by touch by an operator. Generally, the number of touched positions on the touch panel 21 that is allowed for an operator is not limited to one, and an operator is allowed to touch two points, three points or the like; if the number of positions touched by an operator recognized is larger than the allowed number, a processing of disabling the input is performed, for example. Further, if the sum of touched areas exceeds a predetermined sum of area, for example, when an operator touches the touch panel with the entire palm of his hand, the input is regarded as an inappropriate input and a processing of disabling the input is performed. Thus, when the sum of areas where electrodes whose capacitances are increased by a touch by an operator are positioned is within a predetermined reference sum of area, the touch is regarded as appropriate. Therefore, when the sum of areas where electrodes outputting a signal equal to or larger than the touch reference value are positioned exceeds the predetermined reference sum of area, there is no practical problem with regarding the input as inappropriate and regarding the input element 23 as electrically unstable. That is, if the input element 23 is not electrically unstable, when checking a warning screen or warning window displayed on the display 22, the operator can easily understand that the warning screen or warning window is displayed due to his inappropriate input because the input is caused by his own act.

Further, the determiner 16 further counts how many times the input element 23 becomes electrically unstable in a predetermined time period, in other words, calculates how often the input element 23 becomes electrically unstable. Based on the calculated frequency, the determiner 16 classifies (evaluates) the degree of instability of the input element 23 into, for example, any one of three levels: "HIGH", "MIDDLE", and "LOW", and transmits a warning display signal corresponding to the instability level into which the degree of instability was classified to the display controller 12.

According to the operating device 10 of the present embodiment having the above-described configuration, when the operation controller 11 is driven, operation screens as shown in FIG. 2, for example, are shown on the display 22 of the touch panel 21 by the display controller 12.

In the meantime, capacitance is generated between a ground potential and each of the electrodes forming the input element 23 of the touch panel 21; for each of the electrodes, a signal (for example, a voltage signal) corresponding to the capacitance is transmitted from the input element 23 to the input signal processor 14 and to the determiner 16.

Further, when an operator touches the touch panel 21, the capacitance of an electrode arranged at the touched position and the capacitances of electrodes positioned around it are increased, and signals corresponding to the increased capacitances are transmitted from the input element 23 to the input signal processor 14 and to the determiner 16.

The input signal processor 14 processes the signals input thereto in this matter at predetermined sampling intervals and recognizes a touched position touched by an operator on the touch panel 21 (on the operation screens), refers to the operation information stored in the operation information storage 15 based on the recognized touched position, and, in a case where the recognized touched position is a position corresponding to an operation key of an operation screen, generates an operation signal corresponding to the operation information of the operation key and transmits the generated operation signal to the numerical controller 3. Further, the numerical controller 3 controls the machining mechanism 2 in accordance with the operation signal transmitted from the input signal processor 14 in this manner.

On the other hand, the determiner 16 also receives the signal transmitted from the input element 23, determines whether the input element 23 is electrically unstable or not, and when the input element 23 is determined to be electrically unstable, transmits a warning display signal corresponding to the degree of instability of the input element 23 to the display controller 12 so that a warning screen or warning window corresponding to the degree of instability is displayed on the display 22 under control by the display controller 12.

For example, in a case where the degree of instability of the input element 23 is "HIGH", the determiner 16 transmits a warning signal corresponding to "HIGH" to the display controller 12 so that a warning screen or warning window as shown in FIG. 3 is displayed. In a similar manner, a warning screen or warning window as shown in FIG. 4 is displayed in a case where the degree of instability is "MIDDLE" and a warning screen or warning window as shown in FIG. 5 is displayed in a case where the degree of instability is "LOW".

Thus, according to the operating device 10 of the present embodiment, since a warning screen or warning window is displayed on the display 22, the operator can recognize that the input element 23 is electrically unstable, together with the degree of instability. Further, by taking action corresponding to displayed contents, the operator can take an appropriate action corresponding to the degree of instability of the input element 23, for example, emergently cancelling operations in a case where the degree of instability is "HIGH", finishing a current operation and then cancelling subsequent operations in a case where the degree of instability is "MIDDLE", and continuing operations while carefully checking safety in a case where the degree of instability is "LOW". Furthermore, taking such an action can prevent the machining mechanism 2 from operating in accordance with an operation signal generated based on misdetection.

Figure 6:
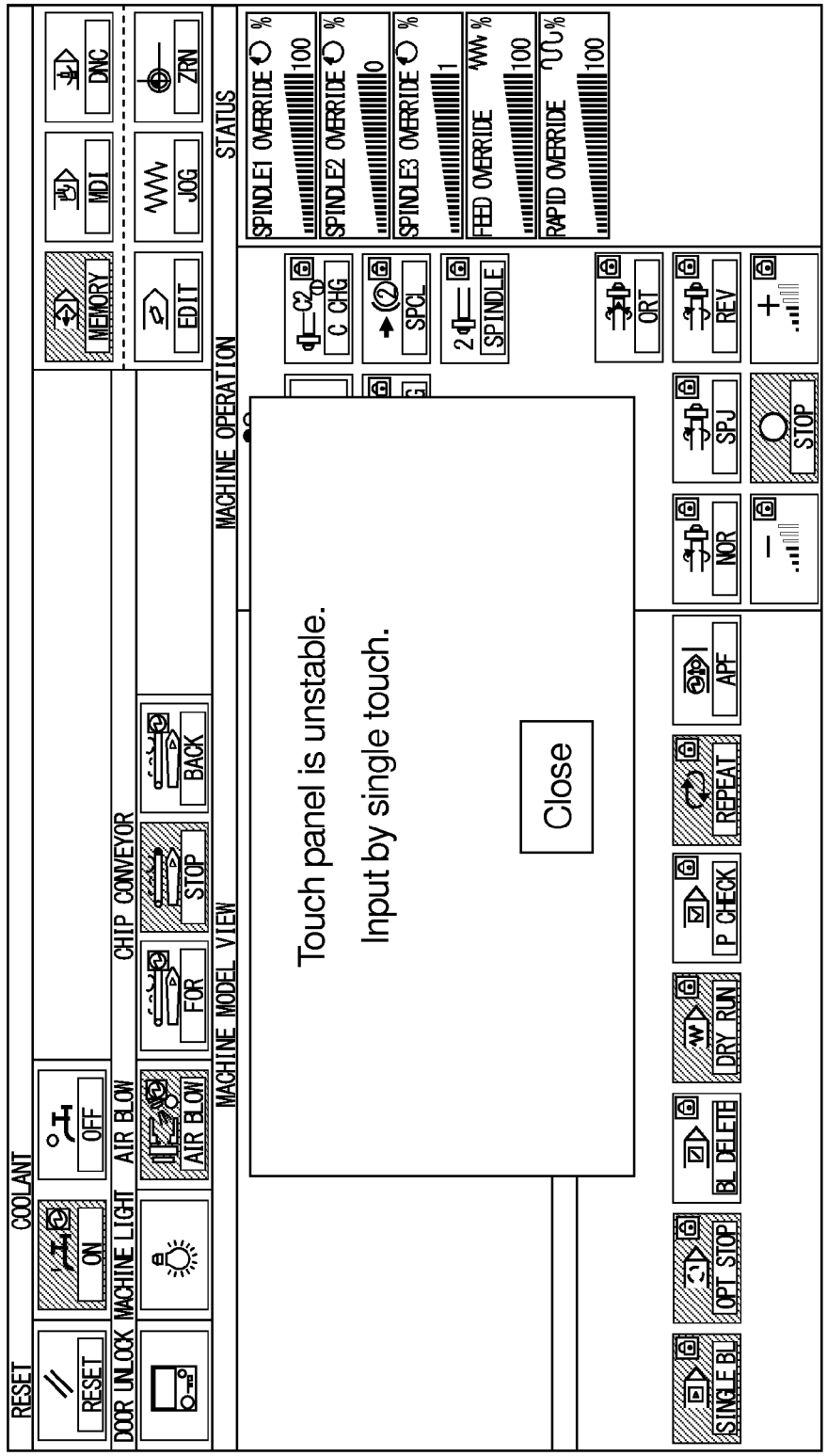
FIG. 6 is a diagram showing a first screen shot of a display screen of an operating device according to a second embodiment.

The determiner 16 may be configured to determine only whether the input element 23 is electrically unstable or not, without determining the degree of instability. Further, the input signal processor 14 may be configured to, when the determiner 16 determines that the input element 23 is electrically unstable, generate an operation signal corresponding to the recognized touched position and transmit the generated operation signal to the numerical controller 3 in a case where only one touched position is recognized, and transmit no operation signal to the numerical controller 3, that is, disable the input, in a case where two or more touched positions are recognized simultaneously. In this case, it is preferred that a warning screen or warning window as shown in FIG. 6 is stored in the display screen data storage 13 and the determiner 16 transmits a warning display signal to the display controller 12 so that the warning screen or warning window as shown in FIG. 6 is displayed on the display 22.

As described above, when the input element 23 is electrically unstable, there is a case where output values from the electrodes exceed the touch reference value even though an operator is not touching the touch panel. In this case, if an operator simultaneously touches multiple positions on the touch panel 21, these touches often induce electrodes positions at other positions around the touched positions to output a signal larger than the touch reference value. In contrast, in the case where the operator touches a single position on the touch panel 21, misdetection of input as described above hardly occurs and relatively stable inputs are made. Therefore, in the case where only one touched position is recognized, there is no problem with regarding the touched position as a position that is actually touched by the operator. If, to the contrary, all of the input from the input element 23 is disabled when the input element 23 is electrically unstable, although it is possible to enhance safety, the operability can be impaired too much.

Therefore, in a configuration in which, in a case where a signal touched position is recognized, the input from the input element 23 is regarded as valid like the operation device 10 of the second embodiment, the operator can continue single-touch input and can continuously performs the operation while checking safety even when the input element 23 is determined to be electrically unstable; therefore, the operability is not impaired extremely. Further, by including contents urging the operator to make inputs by touching a single point on the touch panel 21 in the warning screen or warning window to be displayed on the display when the input element 23 becomes electrically unstable, it is possible to cause the operator to recognize such an input method.

Figure 7:
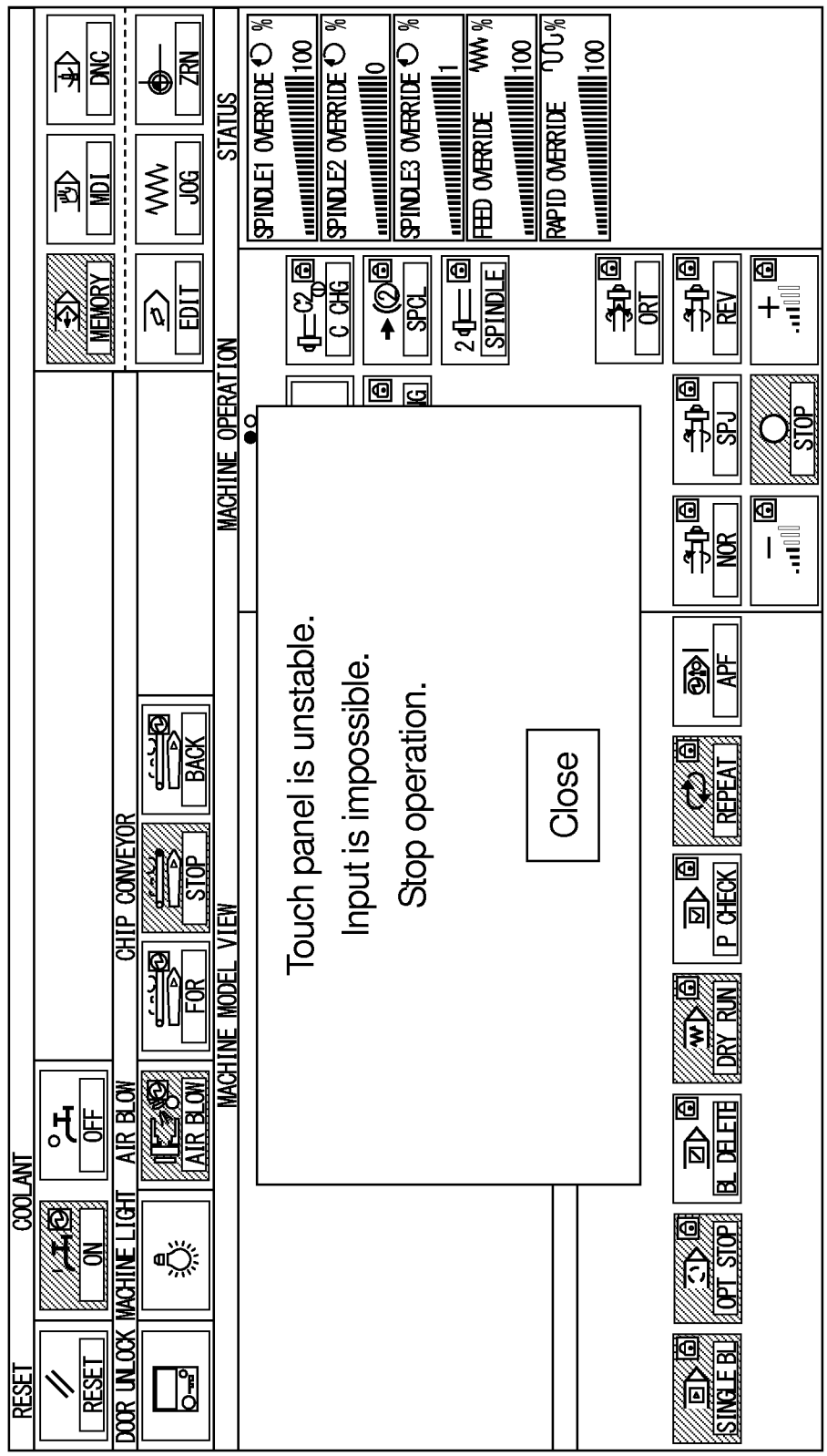
FIG. 7 is a diagram showing a first screen shot of a display screen of an operating device according to a third embodiment.
Figure 8:
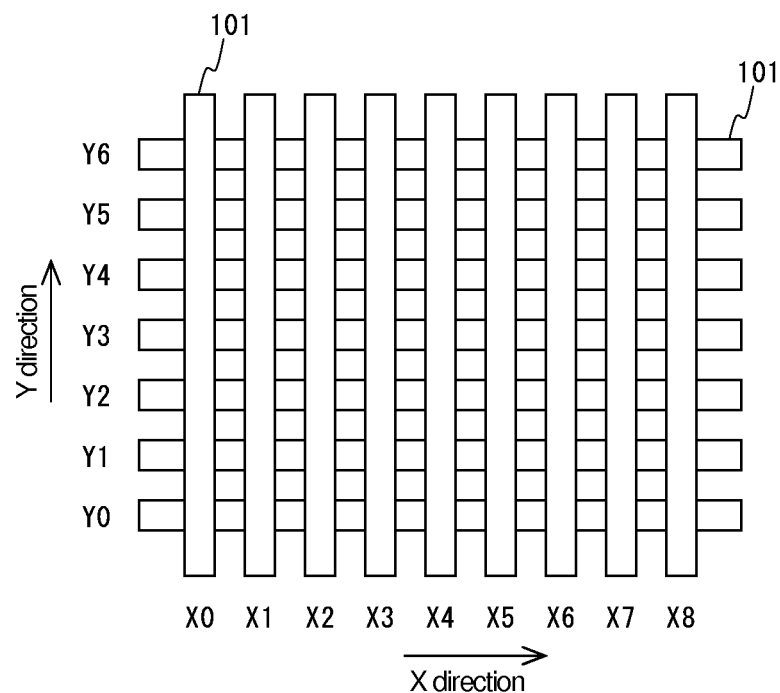
FIG. 8 is a diagram showing an electrode structure of a mutual-capacitance detection type touch panel.
Figure 9:
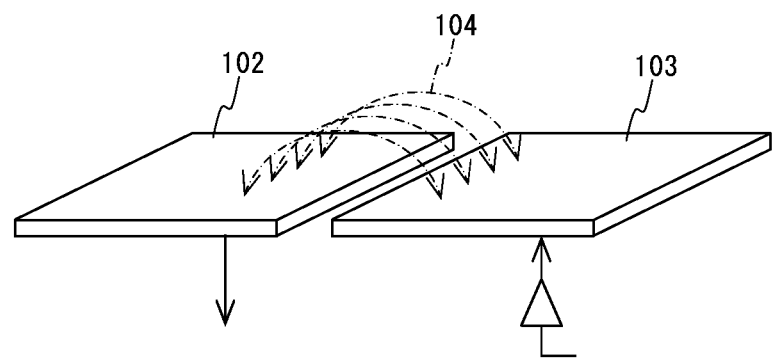
FIG. 9 is a diagram illustrating a principle of detection of the mutual-capacitance detection type touch panel.
Figure 10:
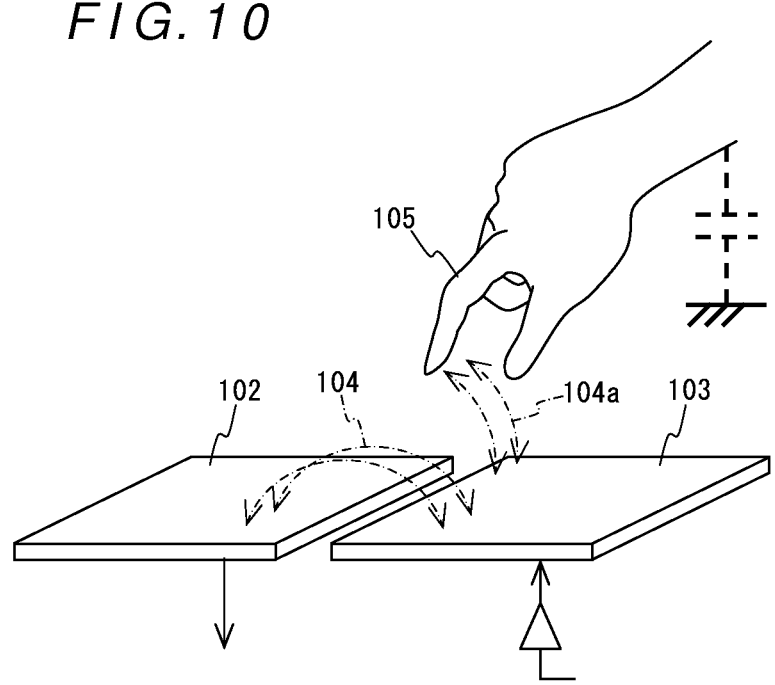
FIG. 10 is a diagram illustrating the principle of detection of the mutual-capacitance detection type touch panel.
Figure 11:
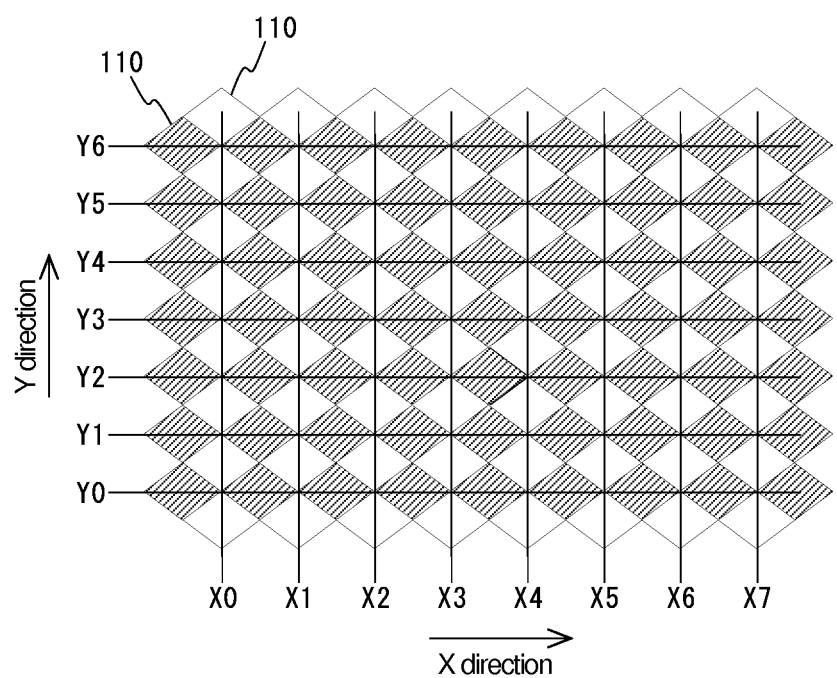
FIG. 11 is a diagram showing an electrode structure of a self-capacitance detection type touch panel.
Figure 12:
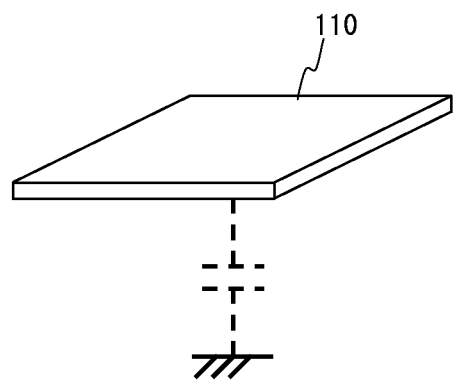
FIG. 12 is a diagram illustrating a principle of detection of the self-capacitance detection type touch panel.
Figure 13:
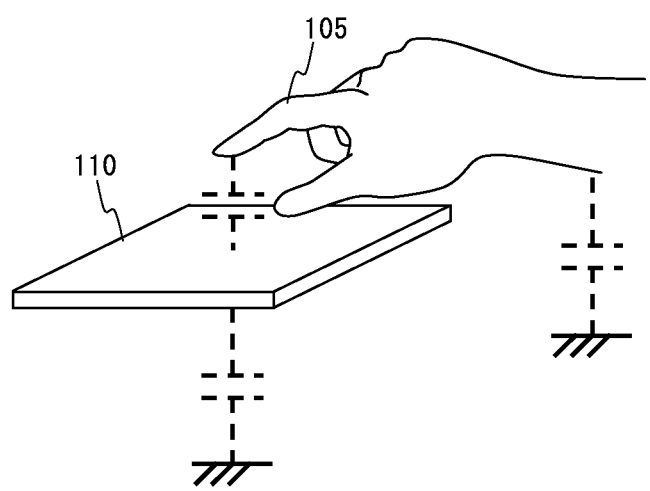
FIG. 13 is a diagram illustrating the principle of detection of the self-capacitance detection type touch panel.

Further, the operating device 10 may be configured so that, in the case where the determiner 16 determines that the input element 23 is electrically unstable, the input signal processor 14 transmits no operation signal to the numerical controller 3. In this case, the determiner 16 may be configured to determine only whether the input element 23 is electrically unstable or not, without determining the degree of instability thereof. Further, it is preferred that a warning screen or warning window as shown in FIG. 7 is stored in the display screen data storage 13 and the determiner 16 transmits a warning display signal to the display controller 12 so that the warning screen or warning window as shown in FIG. 7 is displayed on the display 22. Displaying such a warning screen or warning window makes it possible to cause the operator to recognize that input is impossible.

Although specific embodiments of the present disclosure have been described above, the present disclosure is not limited thereto and may be implemented in other embodiments.

For example, needless to say, the warning screens or warning windows shown in FIGS. 2 to 7 are merely examples and the present disclosure is not limited thereto. For example, the color or design of the screens or operation keys displayed on the operation panel may be changed in accordance with the degree of instability of the input element, or the degree of instability (noise level) may be displayed on a noise gauge. By displaying the degree of instability so that a scale of noise level can be recognized, the operator is allowed to take a measure to reduce the degree of instability of the input element, such as, for example, reinforcing the grounding, while checking the effect of the measure.

Further, although the determiner 16 of the first embodiment is configured to, in the case where the signals output from the input element 23 are compared with the touch reference value and the stability determination reference value smaller than the touch reference value, determine that the input element 23 is electrically unstable when there is an electrode outputting a signal not less than the stability determination reference value and not more than the touch reference value (determination 1), and, in the case where the signals output from the input element 23 are compared with the touch reference value, determine that the input element 23 is electrically unstable when the sum of areas where electrodes outputting a signal equal to or larger than the touch reference value is larger than the predetermined reference sum of area (determination 2), the present disclosure is not limited thereto and the determiner 16 may be configured to determine whether the input element 23 is electrically unstable or not by either one of the determinations 1 and 2 taking into account an actual situation when the input element 23 becomes electrically unstable.

Further, although, in the above embodiments, the determination whether the input element is electrically unstable or not is made by receiving the signals output from the electrodes of the input element, the operating device may have a noise detection element for obtaining a ground noise provided separately from the input element, as shown in FIG. 1. An element detecting a noise current flowing through the electrodes, an antenna and a ground wire can be used as the noise detection element. It is noted that, in this configuration, the term "noise" means an environmental relative potential variation with respect to a detection reference potential of a capacitance type touch panel, for example, and in the case where the noise detection element is provided separately from the input element 23, it is necessary to previously obtain correlation between a noise level detected by the noise detection element and noise based on the detection reference potential of the touch panel.

What is claimed is:

1. An operating device connected to a controller controlling an operation target in order to input an operation signal for operating the operation target to the controller, the operating device comprising:
   a touch panel having a display on which a screen is displayed and an input element superimposed on the display and having a plurality of electrodes arranged in a matrix form on a two-dimensional plane, the input element being configured to output a signal corresponding to capacitance generated between a ground potential and each of the electrodes;
   a display screen data storage storing therein at least data relating to a screen to be displayed on the display of the touch panel and relating to an operation screen in which one or more operation keys are arranged;
   an operation information storage storing therein operation information defined corresponding to a position on the operation screen to be displayed on the display;
   a display controller reading out the operation screen data stored in the display screen data storage and displaying the operation screen on the display of the touch panel;
   an input signal processor receiving signals output from the electrodes of the input element, comparing each of the received signals with a predetermined touch reference value, recognizing a position corresponding to an electrode outputting a signal exceeding the predetermined touch reference value as a touched position touched by an operator, generating an operation signal by referring to the operation information stored in the operation information storage based on the recognized touched position, and transmitting the generated operation signal to the controller; and
   the display screen data storage further storing therein data relating to a warning screen or warning window for warning display;
   the operating device being configured to, when, in a case where each of the signals output from the electrodes of the input element is compared with the predetermined touch reference value and a stability determination reference value smaller than the predetermined touch reference value, an electrode outputting a signal not less than the stability determination reference value and not more than the predetermined touch reference value is present, or when, in a case where each of the signals output from the electrodes of the input element is compared with the predetermined touch reference value, a sum of areas where electrodes outputting a signal equal to or larger than the predetermined touch reference value are positioned exceeds a predetermined reference sum of area, determine that the input element is electrically unstable and cause the display controller to display the warning screen or warning window on the display based on the warning screen or warning window data stored in the display screen data storage.

2. The operating device according to claim 1, wherein:

the display screen data storage stores therein data relating to a plurality of warning screens or warning windows set corresponding to a degree of instability of the input element; and the operating device is configured to count at least how many times a signal output from the electrodes of the input element and indicating a value not less than the stability determination reference value and not more than the predetermined touch reference value is detected in a predetermined time period or how many times the sum of areas where electrodes outputting a signal equal to or larger than the predetermined touch reference value are positioned exceeds the predetermined reference sum of area in the predetermined time period, classify the degree of instability of the input element in accordance with the counted number of times, and cause the display controller to display a warning screen or warning window corresponding to the classification of the degree of instability on the display based on the warning screen or warning window data stored in the display screen data storage.

3. The operating device according to claim 2, wherein the input signal processor is configured to transmit no operation signal to the controller when the input element is electrically unstable.

4. The operating device according to claim 3, wherein the warning screen or warning window data stored in the display screen data storage includes contents urging the operator not to touch multiple positions on the touch panel simultaneously.

5. The operating device according to claim 2, wherein the input signal processor is configured to, when the input element is electrically unstable, generate an operation signal corresponding to the recognized touched position and transmit the generated operation signal to the controller in a case where a single touched position is recognized, and transmit no operation signal to the controller in a case where two or more touched positions are recognized simultaneously.

6. The operating device according to claim 5, wherein the warning screen or warning window data stored in the display screen data storage includes contents urging the operator not to touch multiple positions on the touch panel simultaneously.

7. The operating device according to claim 2, wherein the warning screen or warning window data stored in the display screen data storage includes contents urging the operator not to touch multiple positions on the touch panel simultaneously.

8. The operating device according to claim 1, wherein the input signal processor is configured to transmit no operation signal to the controller when the input element is electrically unstable.

9. The operating device according to claim 8, wherein the warning screen or warning window data stored in the display screen data storage includes contents urging the operator not to touch multiple positions on the touch panel simultaneously.

10. The operating device according to claim 1, wherein the input signal processor is configured to, when the input element is electrically unstable, generate an operation signal corresponding to the recognized touched position and transmit the generated operation signal to the controller in a case where a single touched position is recognized, and transmit no operation signal to the controller in a case where two or more touched positions are recognized simultaneously.

11. The operating device according to claim 10, wherein the warning screen or warning window data stored in the display screen data storage includes contents urging the operator not to touch multiple positions on the touch panel simultaneously.

12. The operating device according to claim 1, wherein the warning screen or warning window data stored in the display screen data storage includes contents urging the operator not to touch multiple positions on the touch panel simultaneously.

* * * * *